United States Patent
Speight

(10) Patent No.: US 8,428,026 B2
(45) Date of Patent: Apr. 23, 2013

(54) SCHEDULING DATA TRANSMISSIONS IN A WIRELESS NETWORK

(75) Inventor: Timothy J. Speight, Bristol (GB)

(73) Assignee: Intellectual Ventures Holding 81 LLC, Las Vegas, NV (US)

( * ) Notice: Subject to any disclaimer, the term of this patent is extended or adjusted under 35 U.S.C. 154(b) by 0 days.

(21) Appl. No.: 13/212,843

(22) Filed: Aug. 18, 2011

(65) Prior Publication Data
US 2012/0014337 A1 Jan. 19, 2012

Related U.S. Application Data

(63) Continuation of application No. 11/430,421, filed on May 8, 2006, now Pat. No. 8,005,041.

(51) Int. Cl.
*H04J 1/16* (2006.01)
*H04J 3/14* (2006.01)
*H04W 4/00* (2009.01)

(52) U.S. Cl.
USPC ........... 370/329; 370/412; 370/415; 370/236; 370/468; 370/341

(58) Field of Classification Search ................ 455/450, 455/452.2, 464; 370/310, 329, 428, 429, 370/412–418, 229, 235–236, 341, 468
See application file for complete search history.

(56) References Cited

U.S. PATENT DOCUMENTS

| | | | |
|---|---|---|---|
| 5,566,175 A * | 10/1996 | Davis | 370/468 |
| 6,845,100 B1 * | 1/2005 | Rinne | 370/395.43 |
| 6,934,250 B1 * | 8/2005 | Kejriwal et al. | 370/229 |
| 7,142,548 B2 | 11/2006 | Fong et al. | |
| 7,372,842 B2 | 5/2008 | Kim et al. | |
| 7,394,765 B2 | 7/2008 | Yi et al. | |
| 7,551,637 B2 | 6/2009 | Damnjanovic et al. | |
| 7,555,010 B2 | 6/2009 | Chun et al. | |
| 7,623,869 B2 | 11/2009 | Lee et al. | |
| 7,630,338 B2 | 12/2009 | Vesterinen et al. | |
| 7,801,105 B2 | 9/2010 | Larsson et al. | |
| 7,912,471 B2 | 3/2011 | Kodikara Patabandi et al. | |
| 7,948,936 B2 | 5/2011 | Lohr et al. | |
| 2004/0064467 A1 | 4/2004 | Kola et al. | |
| 2004/0090974 A1 * | 5/2004 | Balakrishnan et al. | 370/412 |

(Continued)

FOREIGN PATENT DOCUMENTS

| | | |
|---|---|---|
| EP | 1511245 | 3/2005 |
| WO | WO02098077 | 12/2002 |
| WO | WO03049320 | 6/2003 |
| WO | WO03085903 | 10/2003 |

OTHER PUBLICATIONS

Non-Final Rejection issued by USPTO, dated Feb. 6, 2009 for U.S. Appl. No. 11/430,421.

(Continued)

*Primary Examiner* — Ajit Patel
(74) *Attorney, Agent, or Firm* — Volpe and Koenig, P.C.

(57) ABSTRACT

An apparatus and method for scheduling data transmissions in a wireless network is disclosed. A first value related to a buffer is transmitted to a user equipment (UE) by a network. The network also transmits an allocation message for an uplink transmission and receives data in response. The data is selected from the plurality of buffers of the UE in response to the transmitted first value and based on a second value.

16 Claims, 6 Drawing Sheets

U.S. PATENT DOCUMENTS

| | | | |
|---|---|---|---|
| 2004/0160914 A1* | 8/2004 | Sarkar | 370/329 |
| 2005/0020313 A1* | 1/2005 | Chae et al. | 455/562.1 |
| 2005/0047416 A1* | 3/2005 | Heo et al. | 370/395.4 |
| 2005/0052997 A1* | 3/2005 | Montes Linares | 370/230 |
| 2005/0174965 A1 | 8/2005 | Sarkkinen et al. | |
| 2006/0019671 A1 | 1/2006 | Chemiakina et al. | |
| 2008/0212524 A1 | 9/2008 | Niwano | |
| 2010/0322075 A1* | 12/2010 | Sindhu et al. | 370/235 |

OTHER PUBLICATIONS

Non-Final Rejection issued by USPTO, dated Jun. 26, 2009 for U.S. Appl. No. 11/430,421.

Final Rejection issued by USPTO, dated Nov. 30, 2009 for U.S. Appl. No. 11/430,421.

Non-Final Rejection issued by USPTO, dated Aug. 13, 2010 for U.S. Appl. No. 11/430,421.

Notice of Allowance issued by USPTO, dated Apr. 11, 2011 for U.S. Appl. No. 11/430,421.

"3rd Generation Partnership Project; Technical Specification Group Radio Access Network; UTRAN Overall Description (Release 7)," (Mar. 2006).3GPP:Valbonne, France, TS 25.401 v7.0.0:1-48.

"3rd Generation Partnership Project; Technical Specification Group Services and System Aspects; General Packet Radio Service (GPRS); Service Description; Stage 2 (Release 7)," (Mar. 2006). 3GPP:Valbonne, France, TS 23.060 v7.0.0:1-212.

Chinese first Office Action (including translation) dated Apr. 2, 2011 from Chinese Patent Application No. 200780021662.5.

Communication Pursuant to Article 94(3) EPC from European Application No. 07 728 609.4-2412 dated Apr. 9, 2010.

Communication Pursuant to Article 94(3) EPC from European Application No. 07 728 609.4-2412 dated Jul. 31, 2009.

Holma, H. ed. et al., (2001) WCDMA for UMTS, Wiley & Sons, ISBN-0471486876.

Korean Preliminary Office Action (translation) dated Sep. 20, 2010 from Korean Patent Application No. 10-2008-7029455.

Mouly, M., et al. (1992) The GSM System for Mobile Communications, Bay Foreign Language Books, ISBN-2950719007.

Zhang, H. (Oct. 1995) "Service disciplines for guaranteed performance service in packet-switching networks," Proceedings of the IEEE, 83(10):1374-1396.

Manfredi et al.; A Channel Aware Scheduling Algorithm for HSDPA System, 2005 IEEE 16th International Symposium on Personal, Indoor and Mobile Radio Communications; © 2005.

PCT Patent Application No. PCT/EP2007/054154; Notification of Transmittal of International Search Report and Written Opinion; Dated Oct. 16, 2007.

* cited by examiner

US 8,428,026 B2

SCHEDULING DATA TRANSMISSIONS IN A WIRELESS NETWORK

CROSS REFERENCE TO RELATED APPLICATIONS

This application is a continuation of U.S. patent application Ser. No. 11/430,421 filed May 8, 2006, which issued as U.S. Pat. No. 8,005,041 on Aug. 23, 2011.

FIELD OF THE INVENTION

This invention relates to a mechanism to support Internet Protocol data flows within a wireless communication system. The invention is applicable to, but not limited to, gateway queuing algorithms in packet data transmissions, for example, for use in the universal mobile telecommunication standard.

BACKGROUND OF THE INVENTION

In a cellular communication system, a geographical region is divided into a number of cells, each of which is served by base stations, sometimes referred to as Node-Bs. The base stations are interconnected by a fixed network which can communicate data between the base stations. A mobile station, sometimes referred to as user equipment (UE) is served via a radio communication link from the base station of the cell within which the mobile station is situated.

A typical cellular communication system extends coverage over an entire country and comprises hundreds or even thousands of cells supporting thousands or even millions of mobile stations. Communication from a mobile station to a base station is known as the uplink, and communication from a base station to a mobile station is known as the downlink.

The fixed network interconnecting the base stations is operable to route data between any two base stations, thereby enabling a mobile station in a cell to communicate with a mobile station in any other cell. In addition, the fixed network comprises gateway functions for interconnecting to external networks such as the Internet or the Public Switched Telephone Network (PSTN), thereby allowing mobile stations to communicate with landline telephones and other communication terminals connected by a landline. Furthermore, the fixed network comprises much of the functionality required for managing a conventional cellular communication network including functionality for routing data, admission control, resource allocation, subscriber billing, mobile station authentication etc.

Currently, the most ubiquitous cellular communication system is the 2nd generation communication system known as the Global System for Mobile communication (GSM). GSM uses a technology known as Time Division Multiple Access (TDMA) wherein user separation is achieved by dividing frequency carriers into 8 discrete time slots, which individually can be allocated to a user. Further description of the GSM TDMA communication system can be found in 'The GSM System for Mobile Communications' by Michel Mouly and Marie Bernadette Pautet, Bay Foreign Language Books, 1992, ISBN 2950719007.

Currently, 3rd generation systems are being rolled out to further enhance the communication services provided to mobile users. The most widely adopted 3rd generation communication systems are based on Code Division Multiple Access (CDMA) technology. Both Frequency Division Duplex (FDD) and Time Division Duplex (TDD) techniques employ this CDMA technology. In CDMA systems, user separation is obtained by allocating different spreading and scrambling codes to different users on the same carrier frequency and in the same time intervals. In TDD, additional user separation is achieved by assigning different time slots to different users similarly to TDMA. However, in contrast to TDMA, TDD provides for the same carrier frequency to be used for both uplink and downlink transmissions. An example of a communication system using this principle is the Universal Mobile Telecommunication System (UMTS). Further description of CDMA and specifically of the Wideband CDMA (WCDMA) mode of UMTS can be found in 'WCDMA for UMTS', Harri Holma (editor), Antti Toskala (Editor), Wiley & Sons, 2001, ISBN 0471486876.

In a 3rd generation cellular communication system, the communication network comprises a core network and a Radio Access Network (RAN). The core network is operable to route data from one part of the RAN to another, as well as interfacing with other communication systems. In addition, it performs many of the operation and management functions of a cellular communication system, such as billing. The RAN is operable to support wireless user equipment over a radio link of the air interface. The RAN comprises the base stations, which in UMTS are known as Node Bs, as well as Radio Network Controllers (RNC) which control the base stations and the communication over the air interface.

The RNC performs many of the control functions related to the air interface including radio resource management and routing of data to and from appropriate base stations. It further provides the interface between the RAN and the core network. An RNC and associated base stations are known as a Radio Network Subsystem (RNS).

3rd generation cellular communication systems have been specified to provide a large number of different services including efficient packet data services. For example, downlink packet data services are supported within the 3GPP release 5 specifications in the form of the High Speed Downlink Packet Access (HSDPA) service. A High Speed Uplink Packet Access (HSUPA) feature is also in the process of being standardised. This uplink packet access feature will adopt many of the features of HSDPA.

In accordance with the 3GPP specifications, the HSDPA service may be used in both Frequency Division Duplex (FDD) mode and Time Division Duplex (TDD) mode.

In HSDPA, transmission code resources are shared amongst users according to their traffic needs. The base station or "Node-B" is responsible for allocating and distributing the resources to the users, within a so-called scheduling task. Hence, for HSDPA, some scheduling is performed by the RNC whereas other scheduling is performed by the base station. Specifically, the RNC allocates a set of resources to each base station, which the base station can use exclusively for high speed packet services. The RNC furthermore controls the flow of data to and from the base stations.

Therefore, most packet based systems contain schedulers that control when the individual data packets are transmitted, in order to share the available resource, whether time-slots in a time division multiple access (TDMA) communication system or power and codes in a code division multiple access (CDMA) communication system. An introduction to schedulers can be found in 'Service discipline for guaranteed performance service in packet-switching networks', authored by Hui Zhang, and published in the Proceedings of the IEEE, volume 83, no. 10, October 1995.

U.S. Pat. No. 6,845,100 describes use of two separate schedulers; a packet scheduler and a QOS scheduler. The packet scheduler allocates resources to users and then within this user's allocation the QoS scheduler prioritizes some packets over other depending upon the radio bearer they are assigned to.

Thus, there exists a need to provide an improved mechanism to differentiate between IP data flows.

SUMMARY OF THE INVENTION

In accordance with aspects of the present invention, there is provided a wireless communication system, an apparatus, and a method of operation therefor, as defined in the claims.

Accordingly, in one embodiment of the present invention there is provided an apparatus for use in allocating resource in a wireless communication system, the apparatus comprising mapping logic arranged to map one or more services to individual radio bearers of a plurality of radio bearers; reporting logic arranged to indicate buffer occupancy for the plurality of radio bearers; and prioritization logic arranged to prioritize the allocated resource across multiple wireless communication units on a radio bearer basis.

The provision of prioritization logic arranged to prioritize allocated resource across multiple wireless communication units enables prioritization of a particular service across users, so that for instance hyper text transport protocol (HTTP) traffic can be prioritized over file transfer protocol (FTP) traffic, whether the FTP traffic was associated with one user or a number of other users.

In one embodiment of the present invention, the apparatus comprises a database storing a plurality of service specifications, one per wireless communication unit, that define the mapping between data flow and respective radio bearers.

The provision of a database storing a plurality of service specifications provides a very wide range of mapping characteristics can be configured. Furthermore, different mappings can be achieved on a per tier or even per user basis.

In one embodiment of the present invention, the apparatus further comprises signal dividing logic operably coupled to mapping logic and arranged to split services into individual radio bearers from a single (PDP) context.

The provision of the signal dividing logic provides user equipment with the ability to no longer need to send a secondary packet data protocol (PDP) context request to begin a new service, thereby avoiding significant latency.

In one embodiment of the present invention, the wireless communication unit is user equipment arranged to allocate resource in an uplink communication path.

In one embodiment of the present invention, the apparatus is located in a radio access network (RAN) that comprises prioritization logic arranged to allocate resource to a plurality of wireless communication units in a downlink communication path on a radio bearer basis.

In one embodiment of the present invention, a wireless communication unit of the plurality of wireless communication units comprises a signal processor arranged to identify buffer occupancy for individual radio bearers and a transmitter operably coupled to the signal processor and arranged to transmit a message to the radio access network.

The provision of a signal processor arranged to identify buffer occupancy for individual radio bearers (or services) advantageously, enables any system to provide prioritization, whether within a users allocation or across users. In one embodiment of the present invention the message indicates separate buffer occupancy for each of the radio bearers.

The provision of a message that indicates separate buffer occupancy for each of the individual radio bearers provides effective prioritization, in that the allocator knows the buffer occupancy for each radio bearer (RB), in the UL direction. This supports signalling to enable the UE to report this volume.

In one embodiment of the present invention, the apparatus further comprises weighting logic operably coupled to the signal processor and the prioritization logic and arranged to provide a set of weight values for each service across a plurality of users such that the prioritization logic allocates bandwidth resource to individual radio bearers according to a set of weight values.

The provision of weighting logic operably coupled to the signal processor and the prioritization logic allows a proportion of the resource to be allocated to particular radio bearers (e.g. services). This is in contrast to the conventional prioritization scheme provided by 3GPP, which uses a simple absolute priority scheme.

In one embodiment of the present invention, the apparatus further comprises a transmitter transmitting the set of weight values to the wireless communication unit. This feature provides the advantage that the UE can then properly prioritize traffic whilst receiving a single physical allocation from the network and not have to use the simple absolute priority system defined in 3GPP.

In one embodiment of the present invention, the radio access network comprises a scheduler (arranged to schedule prioritized allocated resource across multiple wireless communication units in response to the message.

In one embodiment of the present invention, the radio access network comprises a plurality of classifiers associated with the one or more services operably coupled to the mapping logic such that the mapping logic maps data packets onto respective radio bearers.

The provision of classifiers associated with the one or more services advantageously supports the filtering of services onto radio bearers.

In one embodiment of the present invention, there is provided an apparatus comprising a memory and a processor operably coupled to the memory. Program code is executable on the processor, where the program code is operable for mapping one or more services to individual radio bearers of a plurality of radio bearers; reporting buffer occupancy for the plurality of radio bearers; and prioritizing the allocated resource across multiple wireless communication units on a radio bearer basis.

In one embodiment of the present invention, a wireless communication system comprises a radio access network facilitating communication to a plurality of wireless communication units. The wireless communication system comprises mapping logic arranged to map one or more services to individual radio bearers of a plurality of radio bearers; reporting logic arranged to indicate buffer occupancy for the plurality of radio bearers; and prioritization logic arranged to prioritize the allocated resource across multiple, wireless communication units on a radio bearer basis.

In one embodiment of the present invention, a method for limiting a number of services supported at an instant of time in a wireless communication system is described. The method comprises determining a normalised service weighting parameter of allocated resources; determining a number of resource allocation units allocated to each service; and determining whether the number of services that have resources allocated is greater than a threshold. The method further comprises limiting a number of resource allocation units allocated in response to the number of services that have resources allocated is greater than a threshold; re-calculating a number of resource allocation units allocated to each service; and ordering services in an order of resolute allocation units allocated to each service, and select a number from the ordered services. The method further comprises setting all services not selected to zero; determining whether the number of services that have resources allocated is greater than a threshold; and when said number of services that have resources allocated is greater than the threshold, repeating said steps of re-calculating, ordering, setting and determining.

In this manner, even when a large population of users exist, each with many services, the number of messages required to allocate the overall resource is limited to a manageable number. It is noteworthy that a single user with multiple services, each allocated resource, will only result in a single allocation message. However, by having large numbers of users with large numbers of services the chance of allocating a small amount of resource to many users is increased.

BRIEF DESCRIPTION OF THE DRAWINGS

Embodiments of the invention will be described, by way of example only, with reference to the accompanying drawings, in which.

DESCRIPTION OF EMBODIMENTS OF THE INVENTION

In summary, embodiments of the present invention describe an architecture for supporting IP flows with different quality of service within a wireless communications system. Embodiments of the present invention comprise a database carrying service specifications, one per user equipment, which define the mapping between IP flows and radio bearers. At the user equipment, and within the Radio Access Network, classifiers use the specifications to map IP packets onto the appropriate radio bearers. A scheduler within the Radio Access Network is configured to allocate bandwidths to the different radio bearers, according to a set of weights values. Thus, in this manner, quality of service (QoS) differentiation between different services carried over IP over the wireless network is achieved.

RAN functionality already assumes that data associated with separate service definition specifications (e.g. port numbers) is placed on separate radio bearers. However, in embodiments of the present invention, the RAN functionality is configured to allow services to be prioritized across multiple users, in contrast to prior art techniques that only allow prioritization within a user's allocation.

Figure 1:
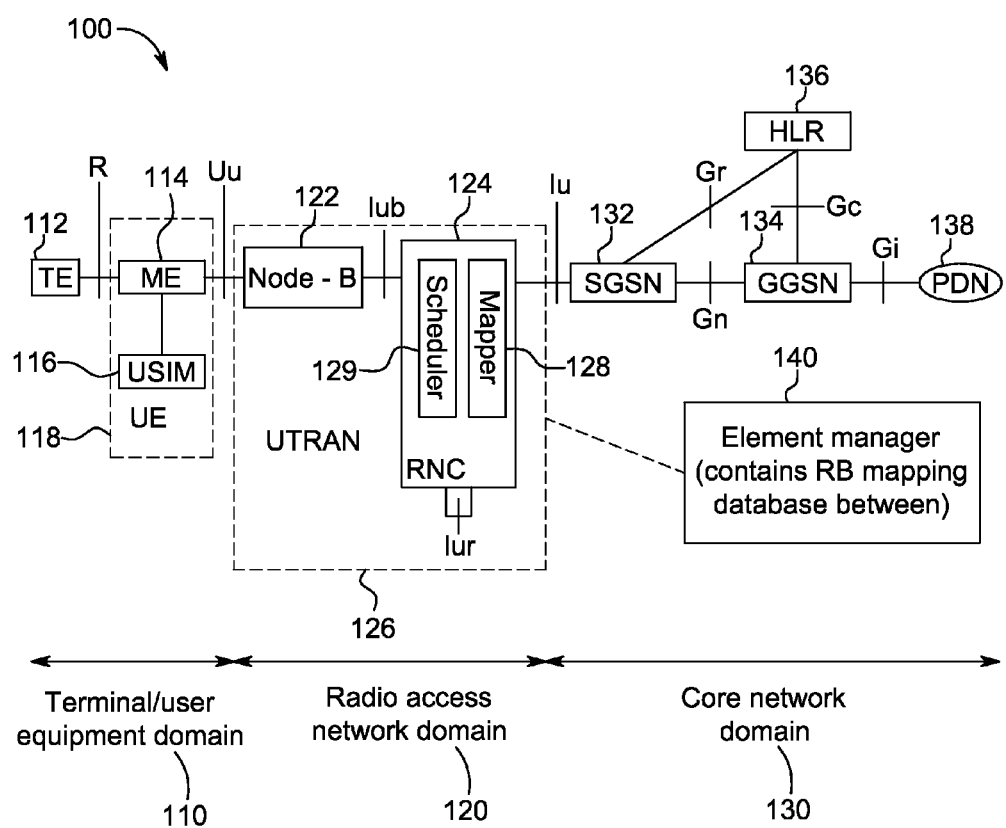
FIG. 1 illustrates a 3GPP cellular communication system capable of supporting embodiments of the present invention.

Referring firstly to FIG. 1, a typical, standard UMTS Radio Access Network (UTRAN) system 100 is conveniently considered as comprising: terminal/user equipment domain 110; a UMTS Terrestrial Radio Access Network domain 120; and an infrastructure domain 130.

In the terminal/user equipment domain 110, terminal equipment (TE) 112 is connected to mobile equipment (ME) 114 via the wired or wireless R interface. The ME 114 is also connected to a user service identity module (USIM) 116; the ME 114 and the USIM 116 together are considered as user equipment (UE) 118. The UE may be for example a remote unit, a mobile station, a communication terminal, a personal digital assistant, a laptop computer, an embedded communication processor or any communication element communicating over the air interface of the cellular communication system.

The UE 118 communicates data with a Node-B (base station) 122 in the radio access network domain 120 via the wireless Uu interface. Within the radio access network domain 120, the Node-B 122 communicates with a radio network controller (RNC) 124 via the Iub interface. The RNC 124 communicates with other RNC's (not shown) via the Iur interface.

The Node-B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Thus, the elements RNC 124, SGSN 132 and GGSN 134 are conventionally provided as discrete and separate units (on their own respective software/hardware platforms) divided across the radio access network domain 120 and the core network domain 130, as shown FIG. 1.

The RNC 124 is the UTRAN element responsible for the control and allocation of resources for numerous Node-B's 122; typically 50 to 100 Node-B's may be controlled by one RNC. The RNC also provides reliable delivery of user traffic over the air interfaces. RNC's communicate with each other (via the Iur interface).

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunneling user data within the core packet network to the ultimate destination (e.g., internet service provider—ISP). Terminal equipment (TE) 112 is connected to mobile equipment (ME) 114 via the wired or wireless R interface. The ME 114 is also connected to a user service identity module (USIM) 116; the ME 114 and the USIM 116 together are considered as user equipment (UE) 118. The UE 118 communicates data with a Node-B (base station) 122 in the radio access network domain 120 via the wireless Uu interface. Within the radio access network domain 120, the Node-B 122 communicates with a radio network controller (RNC) 124 via the Iub interface. The RNC 124 communicates with other RNC's (not shown) via the Iur interface. The Node-B 122 and the RNC 124 together form the UTRAN 126. The RNC 124 communicates with a serving GPRS service node (SGSN) 132 in the core network domain 130 via the Iu interface. Within the core network domain 130, the SGSN 132 communicates with a gateway GPRS support node 134 via the Gn interface; the SGSN 132 and the GGSN 134 communicate with a home location register (HLR) server 136 via the Gr interface and the Gc interface respectively. The GGSN 134 communicates with public data network 138 via the Gi interface.

Thus, the elements RNC 124, SGSN 132 and GGSN 134 are conventionally provided as discrete and separate units (on their own respective software/hardware platforms) divided across the radio access network domain 120 and the core network domain 130, as shown FIG. 1.

The RNC 124 is the UTRAN element responsible for the control and allocation of resources for numerous Node-B's 122; typically 50 to 100 Node-B's may be controlled by one RNC. The RNC 124 also provides reliable delivery of user traffic over the air interfaces. RNC's communicate with each other (via the Iur interface).

The SGSN 132 is the UMTS Core Network element responsible for Session Control and interface to the HLR. The SGSN keeps track of the location of an individual UE and performs security functions and access control. The SGSN is a large centralised controller for many RNCs.

The GGSN 134 is the UMTS Core Network element responsible for concentrating and tunneling user data within the core packet network to the ultimate destination (e.g., internet service provider—ISP).

Such a UTRAN system and its operation are described more fully in the 3rd Generation Partnership Project technical specification documents 3GPP TS 25.401, 3GPP TS 23.060, and related documents, available from the 3GPP website at www.3gpp.org, and need not be described herein in more detail.

Within the RNC 124, separate functional blocks exist that have been incorporated or adapted in accordance with embodiments of the present invention. In particular, as shown in FIG. 1, a Mapper 128 is responsible for mapping IP packets to separate RBs. The Mapper 128 is shown in greater detail in FIG. 2. A scheduler 129 is responsible for allocating a certain proportion of the radio resource to each of the RBs, which is described in further detail with respect to FIG. 3 and FIG. 4.

Additionally, in accordance with embodiments of the present invention, element manager logic 140 has been incorporated into the system, which is used to contain the database that defines the mapping characteristics for IP packets to RBs. The element manager logic 140 also contains the values of the queue weighting parameters, Stier, as described in more detail later.

Figure 2:
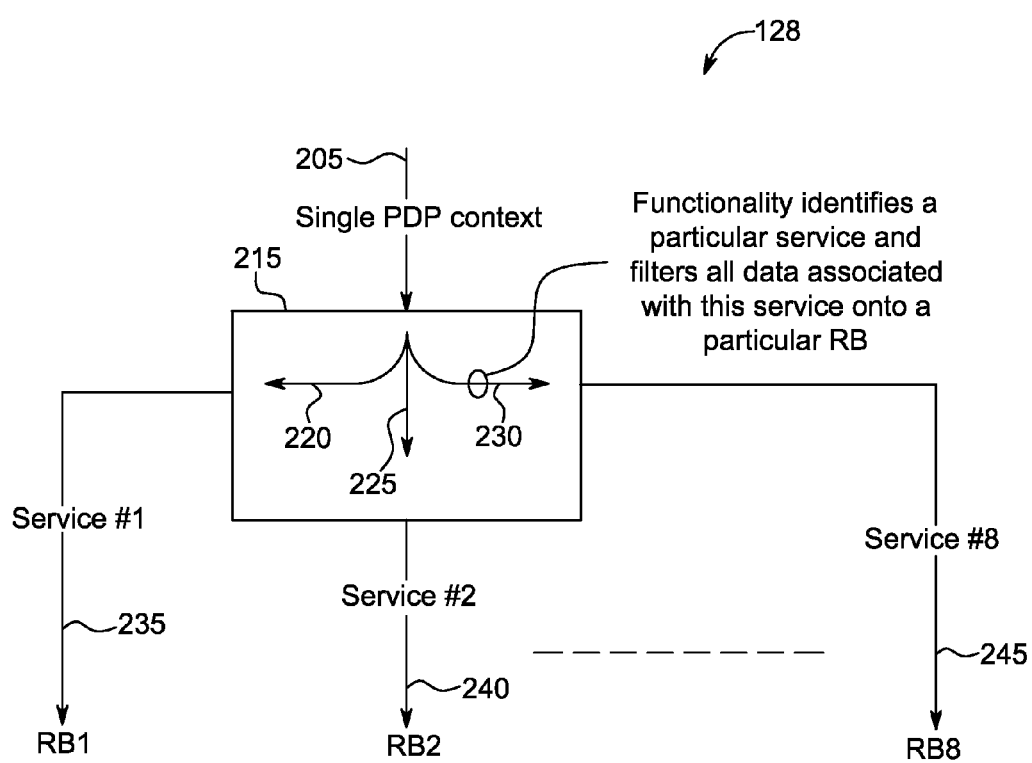
FIG. 2 illustrates a downlink operation to allow service prioritization across a plurality of users according to embodiments of the present invention.

FIG. 2 illustrates a downlink operation according to one embodiment of the present invention that may allow service prioritization across a plurality of users. In this regard, processing logic 128 within the RNC comprises signal dividing logic 215, which splits services 220, 225, 230 into separate radio bearers 235, 240, 245 from a single PDP context 205. In one embodiment of the present invention, the services may be divided between separate radio bearers based on, say, port numbers.

Although eight services/radio bearers are illustrated in FIG. 2, it is envisaged that the inventive concept may be applied to any number of services/radio bearers. In this manner, for each user, the scheduler is now aware of the total amount of data present in buffers for each service.

Figure 3:
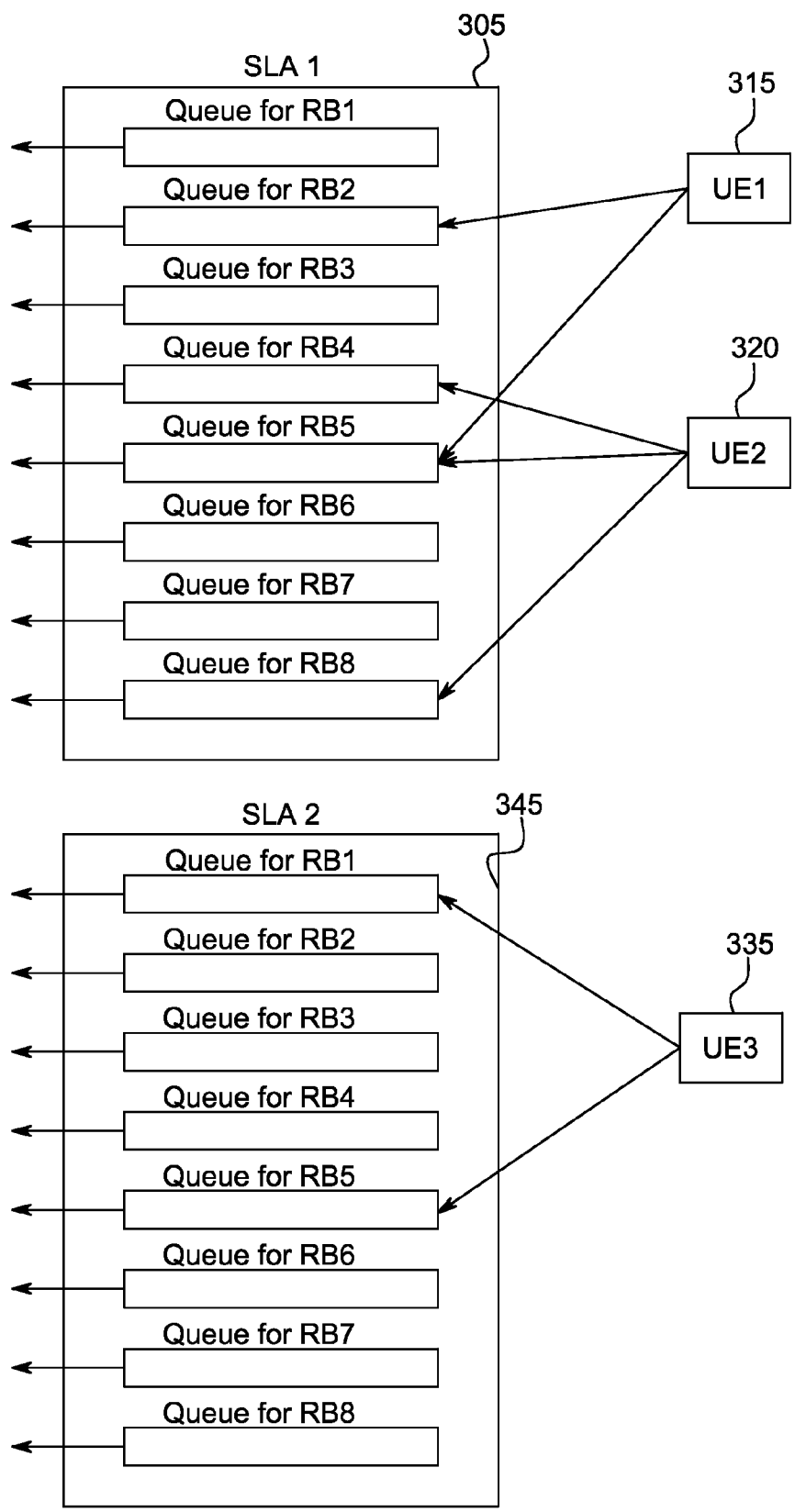
FIG. 3 illustrates an example of a mechanism whereby UEs are mapped to radio bearers according to embodiments of the present invention.

FIG. 3 illustrates an example of a mechanism whereby a plurality of UEs is mapped to radio bearers according to embodiments of the present invention. In this example, a first UE 315, a second UE 320 and a third UE 335 are illustrated, whereby the first UE 315 and second UE 320 use a first service level agreement (SLA-1) 305 and the third UE 335 uses a second (SLA-2) 345. The first SLA-1 305 and the second SLA-2 345 employ a plurality of radio bearers that they organise packet data queues for.

In one embodiment of the present invention, it is envisaged that separate queues may be provided for the same services, but using different SLAs.

Figure 4:
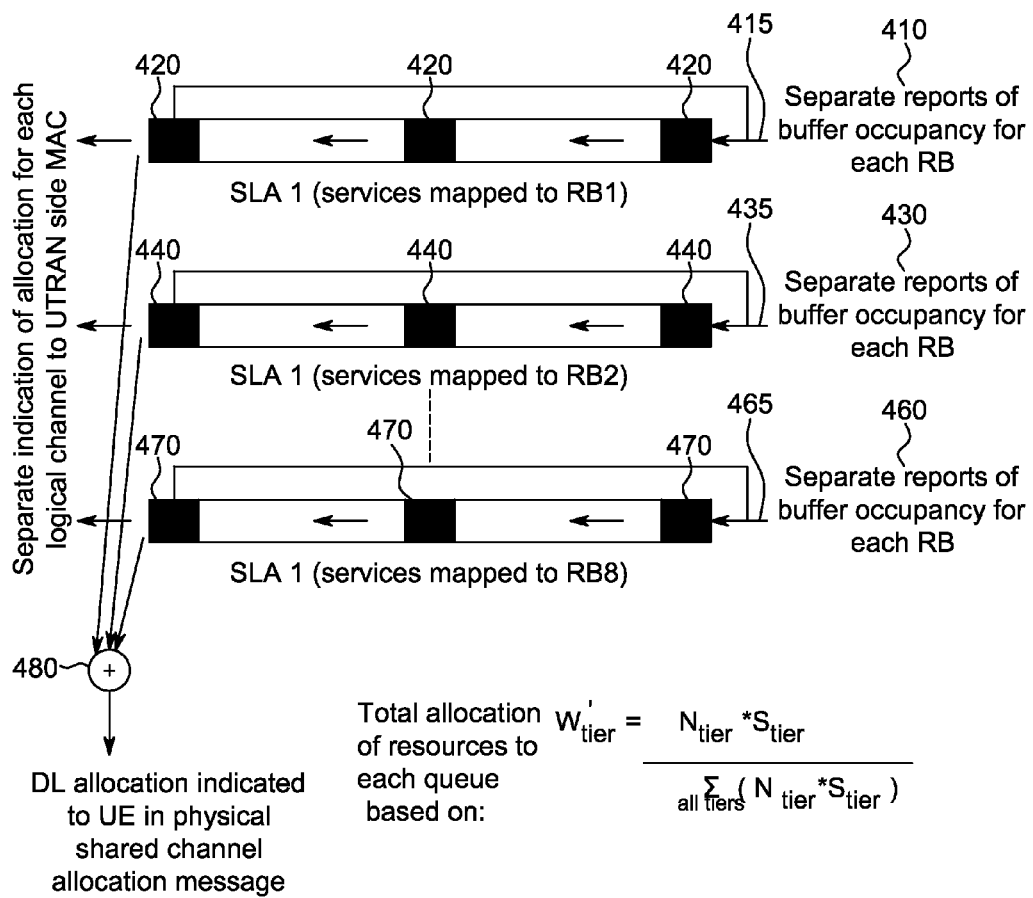
FIG. 4 illustrates a tier-based weighted fair queuing system that can be utilised in embodiments of the present invention.

Referring now to FIG. 4, resource allocator logic associated with a single SLA is shown, i.e. FIG. 4 provides a more detailed version of element 305 in FIG. 3. Separate reports 410, 430, 460 for RBs '1' to '8' are provided and these are associated with separate services within an SLA.

In one embodiment of the present invention, within each queue there is a single indication of the volume of data for each user (for the associated radio bearer) 420, 440, 470 rather than the data itself. Within each queue a simple round robin allocation scheme may operate, whereby when the volume indication reaches the head of the queue a fixed volume of resource is allocated to the user. When the user has been granted this resource, the user is placed at the back of the queue (assuming there is still buffer occupancy left for this user given the resource that has been allocated).

The output from the respective queues provides individual indications of an allocation for each logical channel to the UTRAN side medium access layer (MAC). The outputs are combined in a scheduler 480 that provides a DL allocation that is sent to the respective UEs in a physical shared channel allocation message.

With reference to FIG. 4, the above scheme may be supported in a mechanism that provides 'tier-based, weighted fair queuing'. Briefly, in such a mechanism, each queue determines the weight value based on:

$$W'_{tier} = \frac{N_{tier} * S_{tier}}{\sum_{all\, tiers} (N_{tier} * S_{tier})} \quad [1]$$

Where:

$N_{tier}$ is the number of separate users in the queue.

The overall volume of spare physical resource is then allocated to each queue in proportion to the W'tier values. As mentioned previously, a simple round robin allocation policy may also apply within each queue.

Referring back to FIG. 3 a total of 16 queue weights ($S_{tier}$) are desired. These queue weights define the relative amount of the total resource that is allocated to each queue. Thus, the bandwidth allocated to different radio bearers is shared according to the relative weights. In the implementation, these weights are set by the element manager. However, in one embodiment of the present invention, the weights may also be configured by RADIUS, in which case the service specification is interpreted by the radio resource manager (RRM) to configure appropriate resource allocation (RA) queues and RBs.

The structure of this architecture means that it is possible to provide QoS prioritization across multiple users. Hence, for example, in a scenario where there are two users, one may have hyper-text transfer protocol (HTTP) traffic and this may be mapped to RB1, and a second user may employ file transfer protocol (FTP) traffic, which may be mapped to RB2. The $S_{tier}$ associated with RB1 ($S_{tier\, 1}$) is higher than that for RB2 ($S_{tier\, 2}$). Therefore, assuming the volume of data in the buffers for the 2 users is the same, then the ratio of the total resource allocated to RB1 may be defined as:

$$S_{tier\, 1}/(S_{tier\, 1}+S_{tier\, 2}) \quad [3]$$

Thus, the ratio of the total resource allocated to RB2 may be defined as:

$$S_{tier\,2}/(S_{tier\,1}+S_{tier\,2}) \quad [4]$$

It is noteworthy that there is no restriction on the values associated with each queue weight value ($S_{tier}$). Therefore, in accordance with embodiments of the present invention, it may be possible to, say, set the relative weight for service 1 for SLA-2 to be higher than a number of services on SLA-1, which may nominally be a higher-priority SLA.

In accordance with one embodiment of the present invention, a mechanism to provide prioritization of services across multiple users in an uplink direction is described. In this regard, weight values are signaled to the UE. Again, as described above with respect to a downlink direction, it is assumed that logic exists that splits data onto a number of radio bearers dependent on the type of service. It is also assumed that the UE is able to signal to the network separate buffer occupancy for each queue associated with the various RBs.

If there are multiple QoS requirements within a single 3GPP PDP context, a single physical allocation of radio resources may be made to the UE. In this manner, a single PDP context implies a single CCTrCh. This single physical allocation of radio resources provided to a UE is shared amongst a number of services, in proportion to their respective QoS requirements, for example in proportion to the signalled weight values ($S_{tier}$).

The network knows separate buffer occupancies associated with each RB. Therefore, the logic required to operate the uplink case is largely unchanged compared with the aforementioned downlink case. However, as only a single physical allocation is signaled to the UE, all the physical allocations associated with each queue are summed together. In this regard, this mechanism is unlike the downlink case where direct control of which RB is allocated physical resources is implemented.

In the uplink case, as a single physical allocation is used, the scheduler logic in the network is mirrored with similar scheduler logic in the UE, which takes the single physical allocation and splits it between different RBs using the weight, $S_{tier}$, values. In addition, in order for the UE to know the value of the $S_{tier}$ parameters that are also used at the network side, the uplink case supports signaling between the network and UE to communicate these values.

In one embodiment of the present invention, the signaling of the $S_{tier}$ parameters will typically be sent to the UE when it initially connects to the network (for example in the radio bearer setup message). If there are any modifications to the $S_{tier}$ parameters then these may be typically signaled to the UE in dedicated control signaling (using, for example, a radio bearer reconfiguration message). However, it is also envisaged that $S_{tier}$ parameters could also be signaled to the UE using other mechanisms, such as system information.

Figure 5:
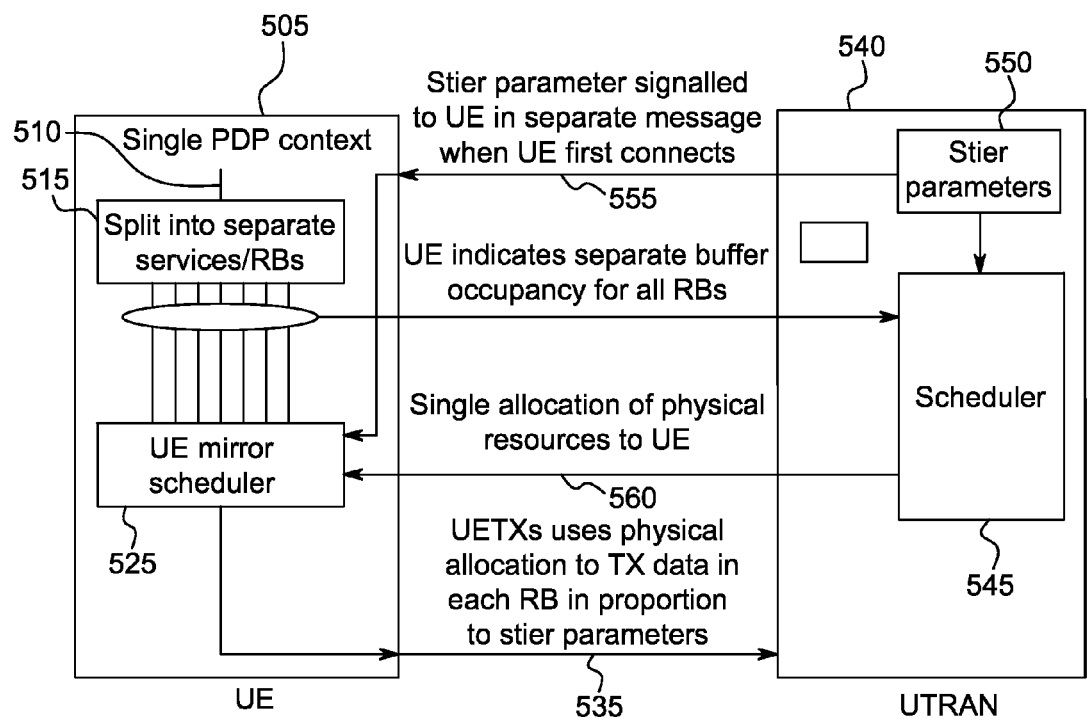
FIG. 5 illustrates a communication system comprising uplink scheduling, in accordance with some embodiments of the invention.

Referring now to FIG. 5, an overview of the communication between an UE 505 and the UTRAN 540 to support an uplink scenario is illustrated. In this regard, the UE 505 may receive a single PDP context 510 and split the single PDP context 510 into separate services on individual radio bearers in divider logic 515. The UE may then transmit a message 535 indicating separate buffer occupancy for each of the radio bearers to a UTRAN scheduler 545.

The separate services on individual radio bearers are input to a UE mirror scheduler 525. In one embodiment of the present invention, the UE mirror scheduler 525 receives a $S_{tier}$ parameter 550 signalled 555 from the UTRAN 540 when the UE first connects to the UTRAN 540. The $S_{tier}$ parameters 550 within the UTRAN 540 are also input to the UTRAN scheduler 545. The UTRAN scheduler 545 is adapted to provide a single allocation of a physical resource to the UE mirror scheduler 525 within message 560. The UE mirror scheduler 525 is then able to inform the UTRAN 540 in a message 535 on its use of the physical allocation, in order to transmit data in each radio bearer in proportion to the informed $S_{tier}$ parameters 555.

Thus, within the UE 505, the $S_{tier}$ values are known, together with the total allocation of resources for the UE 505. Clearly there is only a single SLA at the UE, and $N_{tier}$ can be either a '0' or '1'. Thus, and advantageously, the overall resources allocated by the network are now split up based on the relative values of W'tier.

Furthermore, it is noteworthy that, the aforementioned structure allows the ability to prioritize QoS across users in the DL to be extended to the UL.

As each SLA is can now be split into multiple RBs it may be the case that very small proportions of the overall resources are allocated to each RB. This may create signalling problems, as the mechanism may result in a large number of individual users being allocated some resource at any one time and each user will require a separate allocation message. Therefore, in an enhanced embodiment of the present invention, a mechanism to implement additional functionality to limit a total number of queues served, e.g. to be allocated resource allocation units, is described. Thus, this algorithm limits a number queues that can be allocated resource at any one instance, for example to an operator-specified value. The algorithm may also ensure that the ratio of allocated resource is maintained, over the long term, to the ratios specified by the Stier values.

It is noteworthy that this algorithm can be implemented in both the uplink and downlink.

Figure 6:
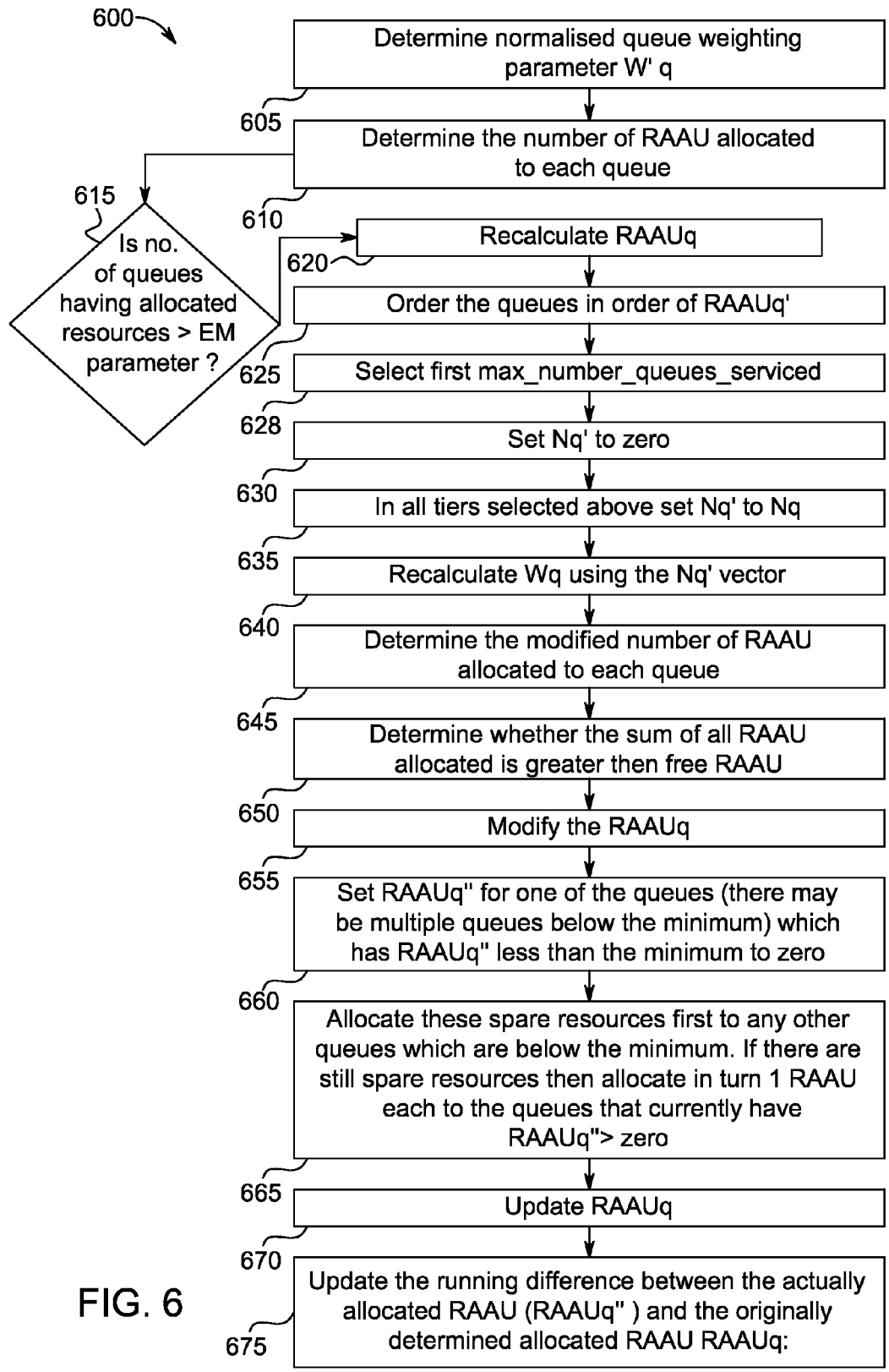
FIG. 6 illustrates a method to limit a number of services/queues to be allocated radio bearers at a particular instant in time, in accordance with embodiments of the invention.

Referring now to FIG. 6, an algorithm 600 employing embodiments of the present invention is illustrated. The algorithm describes one mechanism to limit a number of queues served at a single instant of time. The algorithm may be run when a number of active users (i.e. those users known to have a buffer occupancy greater than zero in any queue) is greater than a known fixed parameter, for example 'max_number_queues_serviced', as defined by the Element Manager (EM).

The process commences in step 605 by determining a normalised queue weighting parameter W'q of the allocated resources:

$$W'_q = \frac{N_q * S_q}{\sum_{q=0}^{NB\_q-1} (N_q * S_q)} \quad [6]$$

Where:
$N_Q$ is the number of entries in queue Q (i.e. the number of UEs with data in queue q); and
NB_q is the number of queues configured at the Node-B.
The process then determines, as shown in step 610, the number of RAAU allocated to each queue, for example using:

$$RAAUq = FreeRAAU * W'_q \quad [7]$$

Where:
RAAU represents a quantum of physical resource (codes and timeslots); and
FreeRAAU is a number of free RAAU that the resource allocator (RA) can share out.

The algorithm may then determine whether the number of queues that have resources allocated greater than the EM parameter—max_number_queues_service, as shown in step 615. If the number of queues that have resources allocated is greater than a threshold, for example the EM parameter max_number_queues_serviced, the process moves to step 620. If the number of queues that have resources allocated is not greater than the EM parameter max_number_queues_serviced then the process may operate as normal as described in the PCT publication WO 03/049320, by the same Applicant as the present invention.

Step 620 re-calculates RAAUq as follows:

$$RAAUq' = RAAUq + running\_RAAU\_delta \qquad [8]$$

Where:

RAAUq is calculated in step 610, and running_RAAU_delta is the running difference between the number of RAAU that would be allocated without the limitation of the number of queues serviced and the number of RAAU allocated with the limitation.

Note that this algorithm is iterative and running_RAAU_delta is determined from the previous iteration of the algorithm. Hence, although no limitation has been applied in the first iteration, on the second iteration the limitation of the number of queues in the previous iteration has meant that there are some queues that did not receive the number of RAAU that were originally determined.

In step 625, the queues are then ordered in order of RAAUq', beginning with the highest queue. The first max_number_queues_serviced queues are then selected, as shown in step 628.

In all queues not selected in step 628, the Nq' value is set to zero, as shown in step 630. In all of the tiers that were selected in step 628, Nq' is set to Nq, as shown in step 635.

In step 640, Wq (now known as W"$_q$) may be re-calculated using the Nq' vector determined in step 635, for example using:

$$W''_q = \frac{N'_q * S_q}{\sum_{q=0}^{NB\_q-1} (N'_q * S_q)} \qquad [10]$$

The modified number of RAAU, allocated to each queue, may then be determined in step 645. For example, the modified number may be determined using:

$$RAAUq'' = round(FreeRAAU * W''q) \qquad [11]$$

where: round( . . . ) rounds to the nearest integer.

The sum of all RAAU allocated may then be determined in step 650. Here, if the sum of all RAAU allocated is greater than freeRAAU (which is possible following the rounding operation in step 645) then the RAAUq" may be modified in step 655, as also described in the PCT publication WO 03/049320, by the same Applicant as the present invention.

It is possible that the volume of resource allocated to the queue may be less than that required given the cell edge state that the UE is in. For example, if the UE is in cell edge '2' then four RAAU will be needed as a minimum. Therefore, if the amount of RAAU allocated by RAAU tier" is less than the minimum required RAAU, given the cell edge state for any q, then RAAUq" may be set for one of the queues that has RAAUq" less than the minimum to zero, as shown in step 660. Here, it is noteworthy that there may be multiple queues below the minimum.

In this scenario, any spare resources are allocated first to any other queues that are below the minimum, as shown in step 665. If there are still spare resources, then any spare resources are allocated in turn; one RAAU each to the queues that currently have RAAUq" greater than zero.

The RAAUq" value is then updated, as shown in step 670. The running difference, between the actually allocated RAAU (RAAUq") and the originally determined allocated RAAU RAAUq, is then updated, as shown in step 675. For example, in this manner:

$$running\_RAAU\_delta := running\_RAAU\_delta + (RAAUq - RAAUq'')$$

Thus, a mechanism is described whereby the number of queue to be allocated resources at any particular time may be limited.

In summary, the inventive concept of the present invention aims to provide at least one or more of the following features:

(i) A method to provide prioritization of services across users in the DL;

(ii) A method to provide prioritization of services across users in the UL. This requires that weight values are signalled to the UE;

(iii) A method to limit the number of queues (i.e. services) to be allocated radio resources at any one time. This functionality is provided in the UL as well as the DL; and (iv) The inventive concept of the present invention enables prioritization of packet types across users, as there is a single allocation process for each packet type and each user. This is particularly beneficial for packet-based, best-effort services. For instance, if a wireless communication system comprises a plurality of users that are performing very large file transfer protocol (FTP) downloads, and another user is web browsing, it is possible to prioritize the web browsing user over the others.

It is noteworthy that U.S. Pat. No. 6,845,100 is significantly different from the inventive concept herein described, which proposes a mechanism that is able to prioritize packet types across users. In one embodiment, this is achieved through provision of a single allocation process for each packet type and each user. This is particularly beneficial for packet based best-effort services. For instance if a first number of users are performing very large file transfer protocol (FTP) downloads, and another user is web browsing, it is possible to prioritize the web browsing user amongst others, in employing the inventive concept herein described, in contrast to the known prior art, such as U.S. Pat. No. 6,845,100, which will not allow this to happen.

In particular, it is envisaged that the aforementioned inventive concept can be applied by a semiconductor manufacturer to any signal processing integrated circuit (IC). It is further envisaged that, for example, a semiconductor manufacturer may employ the inventive concept in a design of a stand-alone device, or application-specific integrated circuit (ASIC) and/or any other sub-system element.

It will be appreciated that any suitable distribution of functionality between different functional units or logic elements, may be used without detracting from the inventive concept herein described. Hence, references to specific functional devices or elements are only to be seen as references to suitable means for providing the described functionality, rather than indicative of a strict logical or physical structure or organization.

Aspects of the invention may be implemented in any suitable form including hardware, software, firmware or any combination of these. Software and firmware may be stored on computer-readable media. The elements and components of an embodiment of the invention may be physically, functionally and logically implemented in any suitable way.

Indeed, the functionality may be implemented in a single unit or IC, in a plurality of units or ICs or as part of other functional units.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled, in the art would recognize that various features of the described embodiments may be combined in accordance with the invention. Further, although embodiments of the present invention may be described, in some instances, using terminology from a particular protocol, those skilled in the art will recognize that such terms are also used in a generic sense herein, and that, unless otherwise specified, the present invention is not limited to systems implementing a particular protocol. In the claims, the term 'comprising' does not exclude the presence of other elements or steps.

Furthermore, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality.

Thus, an improved wireless communication system, apparatus, integrated circuit, and a method of operation therefor have been described, wherein the aforementioned disadvantages with prior art arrangements have been substantially alleviated.

The invention claimed is:

1. A wireless network for allocating resources in the wireless network comprising:
  circuitry configured to send, for each of a plurality of buffers of a user equipment (UE), a first parameter, wherein each of a plurality of radio bearers is associated with a corresponding one of the plurality of buffers;
  circuitry configured to send an allocation message for an uplink resource to the UE;
  circuitry configured to receive data from the plurality of buffers in response to the allocation message, wherein for each buffer with a second parameter above zero, that buffer's data is allocated before other buffer's data with other second parameters less than zero; and
  wherein each second parameter for each buffer is derived from that buffer's first parameter.

2. The wireless network of claim 1 wherein the plurality of buffers each have a differing quality of service (QoS).

3. A method for allocating resources, the method comprising:
  sending, by a wireless network for each of a plurality of buffers of a user equipment (UE), a first parameter, wherein each of a plurality of radio bearers is associated with a corresponding one of the plurality of buffers;
  sending, by the wireless network, an allocation message for an uplink resource to the UE;
  receiving, by the wireless network, data from the plurality of buffers in response to the allocation message, wherein for each buffer with a second parameter above zero, that buffer's data is allocated before other buffer's data with other second parameters less than zero; and
  wherein each second parameter for each buffer is derived from that buffer's first parameter.

4. The method of claim 3 wherein the plurality of buffers each have a differing quality of service (QoS).

5. The method of claim 3 further comprising:
  allocating resources, by the wireless network, to a plurality of wireless communication units in a downlink communication path.

6. The wireless network of claim 1 further comprising circuitry configured to receive a plurality of indications of buffer occupancies corresponding to each of the plurality of buffers.

7. The wireless network of claim 1 wherein the received data includes data of others of the plurality of buffers.

8. The wireless network of claim 1 wherein at least one of the circuitry configured to send the first parameter, the circuitry configured to send the allocation message, or the circuitry configured to receive the data is included in at least one of a base station, Node-B, or radio network controller (RNC).

9. The method of claim 3 further comprising receiving, by the wireless network, a plurality of indications of buffer occupancies corresponding to each of the plurality of buffers.

10. The method of claim 3 wherein the allocated data includes data of others of the plurality of buffers.

11. The method of claim 3 wherein at least one of the sending the first parameter, the sending the allocation message, or the receiving the data is performed by at least one of a base station, Node-B, or radio network controller (RNC).

12. A user equipment comprising:
  at least one circuit comprising a plurality of buffers, wherein each of a plurality of radio bearers is associated with a corresponding one of a plurality of buffers;
  the at least one circuit is further configured to receive a first parameter corresponding to each of the plurality of buffers and receive an allocation message for an uplink resource from a network device;
  the at least one circuit is further configured to allocate data from the plurality of buffers in response to the allocation message, wherein for each buffer with a second parameter above zero, that buffer's data is allocated before other buffer's data with other second parameters less than zero; wherein each second parameter for each buffer is derived from that buffer's first parameter; and
  wherein the at least one circuit is further configured to send the data.

13. The user equipment of claim 12 wherein each second parameter is derived by multiplying the respective first parameter with a third parameter.

14. The user equipment of claim 12 wherein the at least one circuit is further configured to send to a network a plurality of indications of buffer occupancies corresponding to each of the plurality of buffers.

15. The user equipment of claim 12 wherein the plurality of buffers have a differing quality of service (QoS).

16. The user equipment of claim 12 wherein the data includes data of others of the plurality of buffers.

* * * * *

UNITED STATES PATENT AND TRADEMARK OFFICE
CERTIFICATE OF CORRECTION

PATENT NO.          : 8,428,026 B2
APPLICATION NO.     : 13/212843
DATED               : April 23, 2013
INVENTOR(S)         : Speight It is certified that error appears in the above-identified patent and that said Letters Patent is hereby corrected as shown below:

Title Page 2, in Item (56), under "OTHER PUBLICATIONS", in Column 1, Line 11,
delete "2006).3GPP:Valbonne, France, TS 25.401" and
insert -- 2006), 3GPP:Valbonne, France, TS 25.401, --, therefor.

Title Page 2, in Item (56), under "OTHER PUBLICATIONS", in Column 2, Line 1, delete "2006)."
and insert -- 2006), --, therefor.

Title Page 2, in Item (56), under "OTHER PUBLICATIONS", in Column 2, Line 2, delete
"TS 23.060" and insert -- TS 23.060, --, therefor.

In the Drawings:

In Fig. 6, Sheet 6 of 6, for Tag "650", in Line 2, delete "then" and insert -- than --, therefor.

In the Specifications:

In Column 2, Line 25, delete "(RNC)" and insert -- (RNCs) --, therefor.

In Column 3, Line 61, delete "advantageously," and insert -- advantageously --, therefor.

In Column 4, Line 25, delete "(arranged" and insert -- arranged --, therefor.

In Column 4, Line 53, delete "multiple," and insert -- multiple --, therefor.

In Column 4, Line 67, delete "resolute" and insert -- resource --, therefor.

In Column 5, Line 41, delete "DESCRIPTION" and insert -- DETAILED DESCRIPTION --, therefor.

Signed and Sealed this
Twentieth Day of August, 2013

Teresa Stanek Rea
*Acting Director of the United States Patent and Trademark Office*

CERTIFICATE OF CORRECTION (continued)
U.S. Pat. No. 8,428,026 B2

In Column 6, Line 20, delete "RNC's" and insert -- RNCs --, therefor.

In Column 6, Line 38, delete "numerous Node-B's" and insert -- numerous Node-Bs --, therefor.

In Column 6, Line 39, delete "100 Node-B's" and insert -- 100 Node-Bs --, therefor.

In Column 6, Line 41, delete "RNC's" and insert -- RNCs --, therefor.

In Column 6, Line 61, delete "RNC's" and insert -- RNCs --, therefor.

In Column 7, Line 11, delete "numerous Node-B's" and insert -- numerous Node-Bs --, therefor.

In Column 7, Line 12, delete "100 Node-B's" and insert -- 100 Node-Bs --, therefor.

In Column 7, Line 15, delete "RNC's" and insert -- RNCs --, therefor.

In Column 10, Line 8, delete "555." and insert -- 550. --, therefor.

In Column 11, Line 3, delete "_service," and insert -- _serviced, --, therefor.

In Column 12, Line 10, after Equation, insert -- [12] --.

In Column 12, Line 13, delete "queue" and insert -- queues --, therefor.

In Column 13, Line 9, delete "skilled," and insert -- skilled --, therefor.